United States Patent
Santos-Gomez (10) Patent No.: US 9,678,656 B2
(45) Date of Patent: Jun. 13, 2017

(54) PREVENTING ACCIDENTAL SELECTION EVENTS ON A TOUCH SCREEN

(71) Applicant: INTERNATIONAL BUSINESS MACHINES CORPORATION, Armonk, NY (US)

(72) Inventor: Lucinio Santos-Gomez, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 163 days.

(21) Appl. No.: 14/576,573

(22) Filed: Dec. 19, 2014

(65) Prior Publication Data

US 2016/0179324 A1    Jun. 23, 2016

(51) Int. Cl.
| | | |
|---|---|---|
| *G06F 3/041* | (2006.01) | |
| *G06F 3/0488* | (2013.01) | |
| *G06F 3/0485* | (2013.01) | |
| *G06F 3/0482* | (2013.01) | |
| *G06F 3/0484* | (2013.01) | |

(52) U.S. Cl.
CPC ............ *G06F 3/0488* (2013.01); *G06F 3/041* (2013.01); *G06F 3/0482* (2013.01); *G06F 3/0485* (2013.01); *G06F 3/04842* (2013.01); *G06F 3/04883* (2013.01); *G06F 3/04886* (2013.01)

(58) Field of Classification Search
CPC ...... G06F 3/0488; G06F 3/041; G06F 3/0482; G06F 3/0485
USPC ........................................................ 345/173
See application file for complete search history.

(56) References Cited

U.S. PATENT DOCUMENTS

| | | | |
|---|---|---|---|
| 7,061,474 B2 | 6/2006 | Hinckley et al. | |
| 8,305,356 B1 | 11/2012 | Jang | |
| 2003/0146905 A1* | 8/2003 | Pihlaja | G06F 3/0488 345/173 |
| 2011/0037720 A1* | 2/2011 | Hirukawa | G06F 3/0488 345/173 |
| 2011/0090165 A1* | 4/2011 | Oh | G06F 3/0488 345/173 |
| 2012/0096393 A1 | 4/2012 | Shim et al. | |
| 2012/0242576 A1* | 9/2012 | Mizunuma | G06F 1/1626 345/158 |
| 2012/0249435 A1 | 10/2012 | Nahm | |
| 2013/0113744 A1 | 5/2013 | Liu | |

(Continued)

OTHER PUBLICATIONS

W. Anwar, "Handling Android ListView onItemClick Event", www.ezzylearning.com, Aug. 14, 2011, pp. 1-12.

(Continued)

*Primary Examiner* — Jason Olson
(74) *Attorney, Agent, or Firm* — Law Office of Jim Boice (57) ABSTRACT

Inadvertent touch selection events from a touch screen are avoided. A threshold physical distance between a touch start and a touch end for a touch screen is set. A touch input from the touch screen is received. A determination is made as to whether or not the touch input traverses a distance that is less than or greater than the threshold physical distance. In response to determining that the touch input traverses a distance that is less or equal to the threshold physical distance, a processor activates a selection event for an item. In response to determining that the touch input traverses a distance that is greater than the threshold physical distance, the processor scrolls the plurality of scrollable items.

20 Claims, 5 Drawing Sheets

(56) References Cited

U.S. PATENT DOCUMENTS

2014/0009423 A1* 1/2014 Higuchi ............... G06F 3/0485
345/173
2015/0301648 A1* 10/2015 Ogawa ................. G06F 3/0488
345/174

OTHER PUBLICATIONS

L. Vogel, "Handling Single and Multi Touch on Android—Tutorial", www.vogella.com, Aug. 20, 2013, pp. 1-10.
Anonymous, "UIScrollView", Apple, Inc., developer.apple.com, retrieved Dec. 19, 2014, pp. 1-2.
Anonymous, "Scroller", Google, Inc., developer.android.com, retrieved Dec. 19, 2014, pp. 1-7.
Anonymous, "Method and System for Programmatically Influence the Interval of Touch Screen Scrolling", IP.com, IPCOM000226366D, Mar. 30, 2013, pp. 1-4.
Lenovo et al., "Method to Avoice Unintended Selections on a Touch Device", IP.com, IPCOM000213643D, Dec. 24, 2011, pp. 1-2.

* cited by examiner

PREVENTING ACCIDENTAL SELECTION EVENTS ON A TOUCH SCREEN

BACKGROUND

The present disclosure relates to the field of computers, and specifically to computers having touch screen displays. Still more particularly, the present disclosure relates to touch screen displays that enable scrolling through and selection of displayed items.

SUMMARY

In an embodiment of the present invention, a method and/or computer program product avoids inadvertent touch selection events from a touch screen. A threshold physical distance between a touch start and a touch end for a touch screen is set. A touch input from the touch screen is received. A determination is made as to whether or not the touch input traverses a distance that is less than or greater than the threshold physical distance. In response to determining that the touch input traverses a distance that is less than or equal to the threshold physical distance, a processor activates a selection event for an item being displayed at a location currently being touched on the touch screen, where the item is from a plurality of scrollable items, and where the touch input is determined to be an item selection input for executing an item selection instruction that selects the item being displayed at the location currently being touched on the touch screen. In response to determining that the touch input traverses a distance that is greater than the threshold physical distance, the processor repositions the plurality of scrollable items in accordance with the touch input, where the touch input is determined to be a scrolling instruction for scrolling the plurality of scrollable items on the touch screen.

In an embodiment of the present invention, a mobile device comprises a touch screen and a processor. The processor sets a threshold physical distance between a touch start and a touch end for a touch screen. A touch input is received from the touch screen by the processor, which determines whether the touch input traverses a distance that is less than or greater than the threshold physical distance. In response to determining that the touch input traverses a distance that is less than or equal to the threshold physical distance, the processor activates a selection event for an item being displayed at a location currently being touched on the touch screen, where the item is from a plurality of scrollable items, and where the touch input is determined to be an item selection input for executing an item selection instruction that selects the item being displayed at the location currently being touched on the touch screen. In response to determining that the touch input traverses a distance that is greater than the threshold physical distance, the processor repositions the plurality of scrollable items in accordance with the touch input, where the touch input is determined to be a scrolling instruction that scrolls the plurality of scrollable items on the touch screen.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Mobile devices, their operating systems and various toolkits support interactions with User Interface objects through touch gestures represented as events (e.g., touchStart, touchMove, touchEnd, etc.).

Two of the most pervasive interactions with mobile applications involve Scrolling and Selection gestures (browsing/searching for an object, and opening one of them for further interaction). Applications often list options through images, text or a combination of the two (e.g., news headings). In a common scroll-select-details interaction pattern in mobile applications, the user scrolls through a list of elements (which themselves may comprise other elements, like in the news headings mentioned earlier), selects one of those elements, and opens it for more detailed interaction (for viewing, authoring or other purposes).

The present invention addresses and solves the problem of touch inputs intended for scrolling being misinterpreted as selection actions. That is, a hand gesture intended for scrolling (drag gesture) is (mis)interpreted by the device as a selection gesture. As the user performs a scroll gesture repeatedly (e.g., to browse through a list), the quality of the gesture decreases since one of the gestures intended for scrolling gets interpreted by the device as a selection input, resulting in the opening of elements that disrupts the experience or alters the view (e.g., by opening an overlay, or navigating to a different view or page). This results in the user having to return to the list display to reconvene the scrolling/browsing behavior, with the corresponding flow disruption and time waste.

Figure 1:
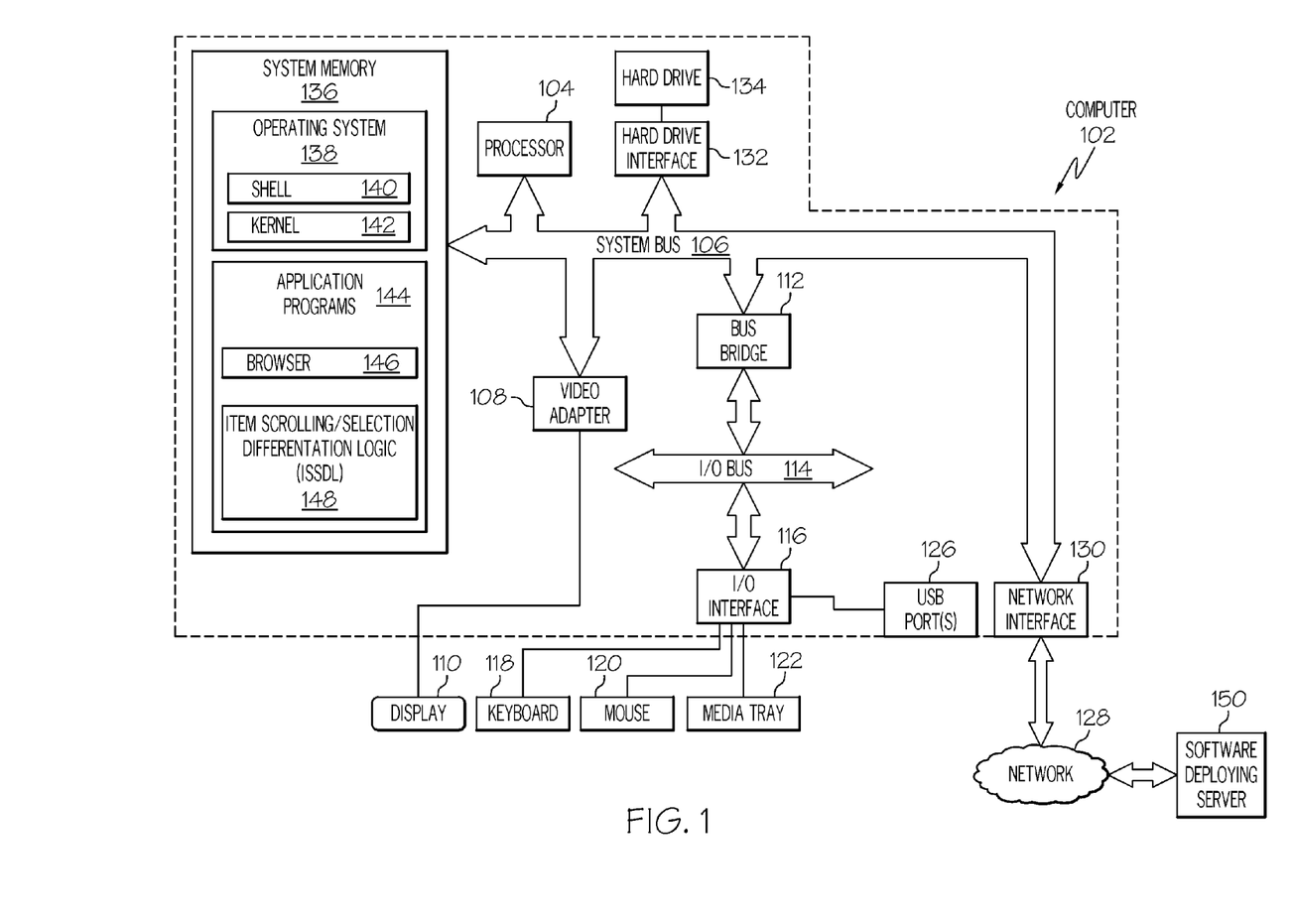
FIG. 1 depicts an exemplary system and network in which the present disclosure may be implemented.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. In one or more embodiments of the present invention, video adapter 108 is a hardware video card. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include an item scrolling/selection differentiation logic (ISSDL) 148. ISSDL 148 includes code for implementing the processes described below, including those described in FIGS. 2-6. In one embodiment, computer 102 is able to download ISSDL 148 from software deploying server 150, including in an on-demand basis, wherein the code in ISSDL 148 is not downloaded until needed for execution. Note further that, in one embodiment of the present invention, software deploying server 150 performs all of the functions associated with the present invention (including execution of ISSDL 148), thus freeing computer 102 from having to use its own internal computing resources to execute ISSDL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
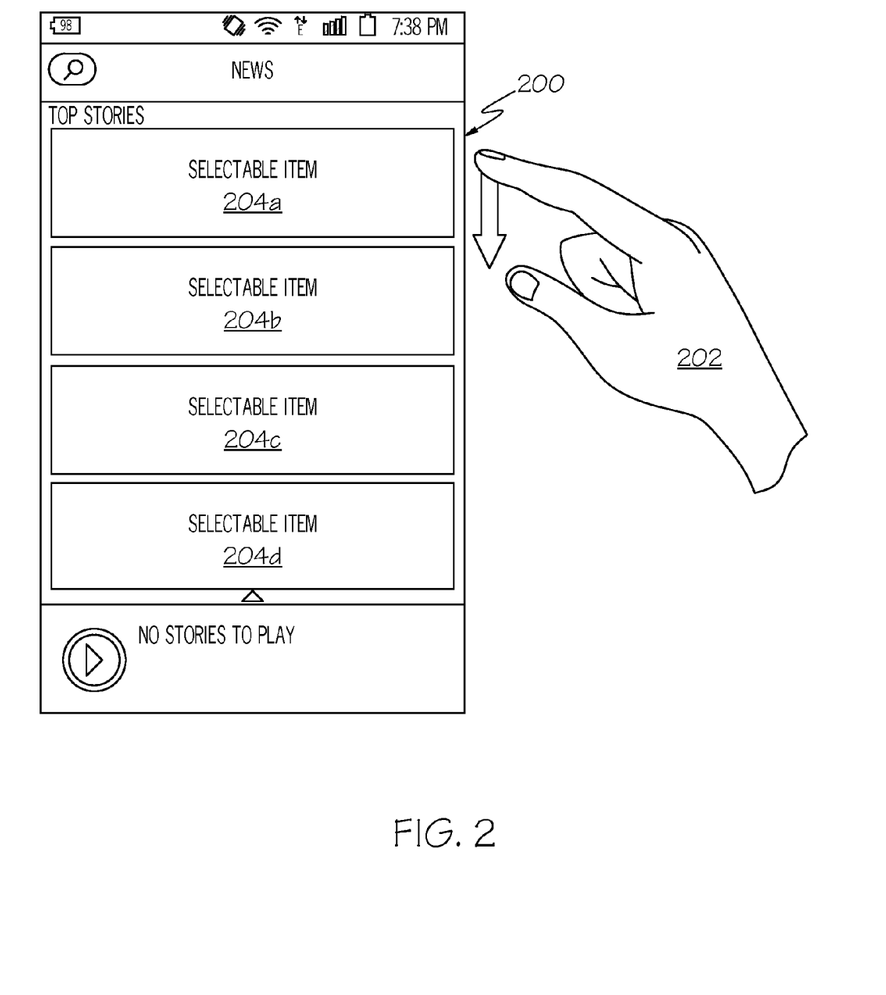
FIG. 2 illustrates a user scrolling through items on a touch screen.

With reference now to FIG. 2, an exemplary touch screen 200, which may be part of a computer (e.g., a tablet computer), a mobile communication device (e.g., a "smart" phone), etc., is manipulated by a user's hand 202 dragging various selectable items 204a-204d, as depicted. That is, as the user's hand 202 moves downward while touching the touch screen 200, the positions of the selectable items 204a-204d move downwards on the touch screen 200. However, too often the system (e.g., the smart phone of which the touch screen 200 is a part) misinterprets the user's scrolling input as a selection input. Note that the touch screen 200 is a hardware device (i.e., a "touch screen device").

Figure 3:
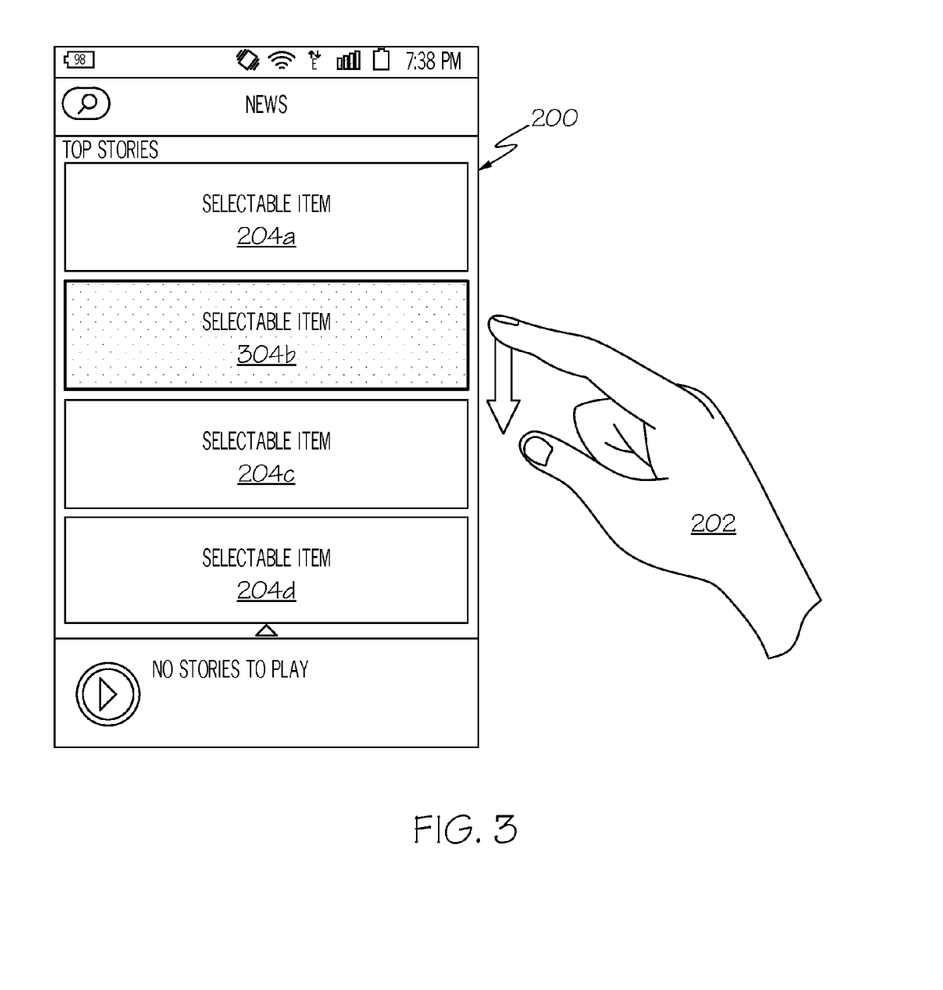
FIG. 3 depicts a user inadvertently selecting a scrollable item from a touch screen.

For example, as shown in FIG. 3, selectable item 204b (now identified as selectable item 304b and shaded), has been selected by the system, which interpreted a portion of the user's scrolling touch input as a selection input, although the user intended the touch point as a scrolling gesture. This misinterpretation of the touch point as a selection gesture by the system will result in a selection event trigger by the system, which places the target in a selection state, which in turn results in the displaying of new content and modifying the current view accordingly. For example, in a mobile application displaying news headings, the system's misinterpretations of a touch point as a selection gesture as the user scrolls down the list of news headings, will result in the view being replaced by another view expanding the details of the "selected" news item. The misunderstanding by the system may be the result of the user's hand 202 lingering too long over the selectable item 204b, by the user's hand 202 shaking/vibrating while over the selectable item 204b, etc. The present invention overcomes such misunderstandings.

Figure 4:
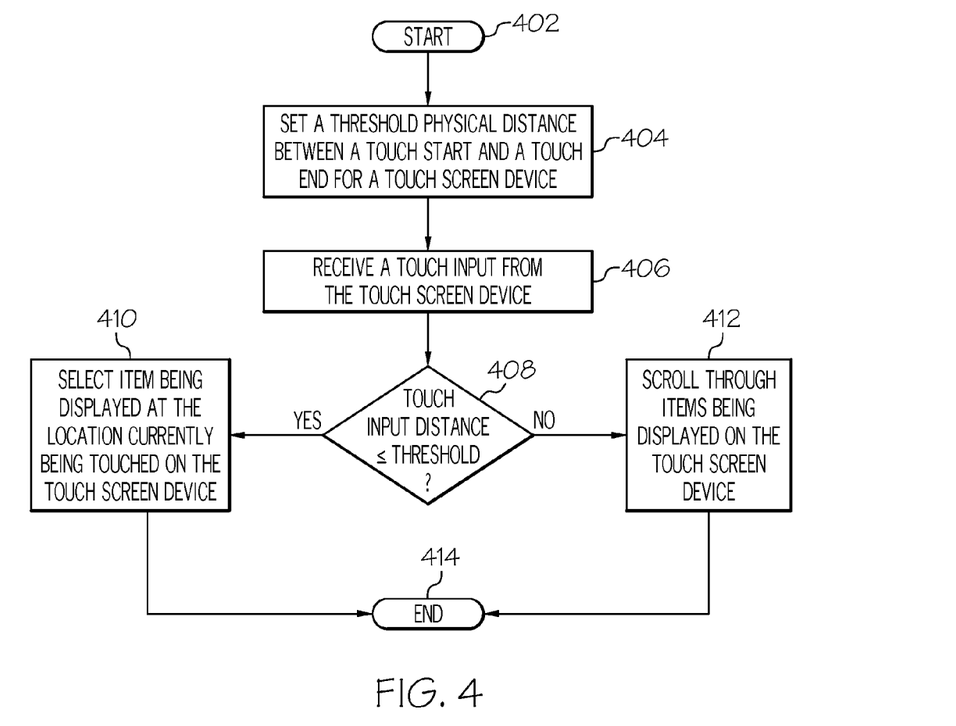
FIG. 4 is a high level flow-chart of one or more operations performed by one or more hardware devices to avoid inadvertent selections of scrollable items from a touch screen.
Figure 5:
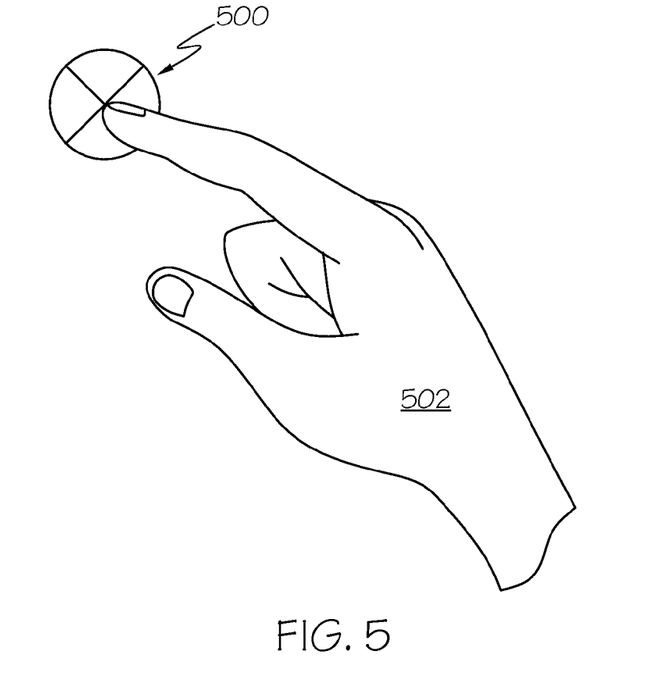
FIG. 5 illustrates a first exemplary touchdown drag selection threshold.
Figure 6:
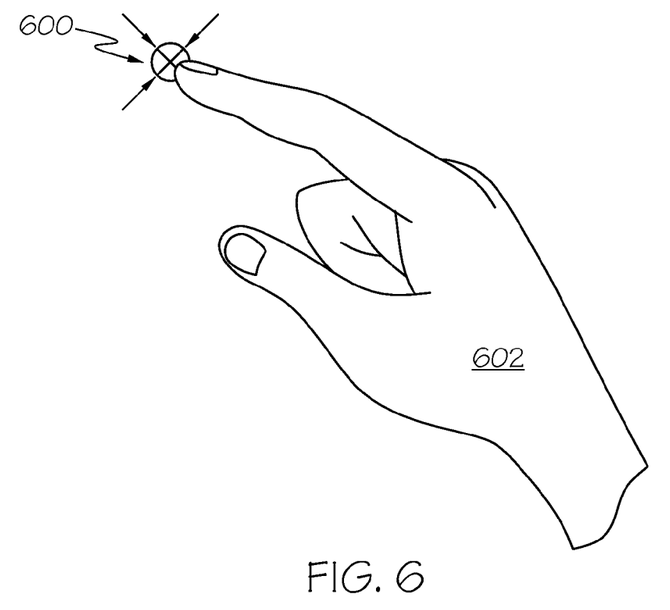
FIG. 6 depicts a second updated touchdown drag selection threshold.

With reference now to FIG. 4, a high level flow-chart of one or more operations performed by one or more hardware devices to avoid inadvertent selections of scrollable items from a touch screen is presented.

After initiator block 402, a threshold physical distance is set between a touch start and a touch end for a touch screen (block 404). Various embodiments of the present invention regarding how this threshold physical distance is set are described below. However, as described herein, this threshold physical distance is defined as a distance that if exceeded by a touch input is interpreted as a scrolling command, and if not reached by a touch input is interpreted as a selection command. For example, if a user drags his fingertip 30 mm along the touch screen and then lifts his/her finger off the touch screen (or a predefined amount of time passes), the system will interpret this as a scrolling command (as in FIG. 2). However, if a user drags his fingertip only 2 mm along the touch screen and then lifts his/her finger off the touch screen (or a predefined amount of time passes), the system will interpret this as a selection command (as in FIG. 3).

Thus, returning now to FIG. 4, the system (e.g., a processor within a mobile device such as a smart phone or tablet computer) receives a touch input from the touch screen, as described in block 406. The system then determines whether the touch input traverses a distance that is less than or greater than the threshold physical distance (query block 408).

As described in block 410, in response to determining that the touch input traverses a distance that is less than or equal to the threshold physical distance, the system activates a selection event for an item being displayed at a location currently being touched on the touch screen. As shown in FIG. 3, the selected item is multiple scrollable items 204a-204d. Thus, in block 410, the touch input is determined to be an item selection input for executing an item selection instruction that selects the item being displayed at the location currently being touched on the touch screen (e.g., selectable item 304b in FIG. 3).

However, as described in block 412, in response to determining that the touch input traverses a distance that is greater than the threshold physical distance, the system repositions the scrollable items in accordance with the touch input, such that the touch input is determined to be a scrolling instruction that scrolls the plurality of scrollable items on the touch screen (as shown in FIG. 2).

The flow chart ends at terminator block 414.

In an embodiment of the present invention, the system is able to "learn" about the user's input touch style in order to determine whether the user intends to scroll scrollable items or to select one of the scrollable items. Thus, in one or more embodiments of the present invention, the system receives multiple touch inputs from the touch screen. The system then identifies/determines a smallest distance traversed on the touch screen by the multiple touch inputs. For example, the user may drag his finger along the touch screen as it is displaying the multiple scrollable items 5 times. The distances that the user dragged his finger on the touch screen were (in millimeters) 10, 8, 3, 9, and 7. In this example, "3" is the smallest distance traversed on the touch screen by the multiple touch inputs. The system then sets this smallest distance ("3") traversed on the touch screen by the multiple touch inputs as the threshold physical distance between the touch start and the touch end. Thereafter, the system interprets any finger movement across the touch screen that is 3 mm or less in length to be a selection input, rather than a scrolling input.

In one embodiment of the present invention, the threshold physical distance and the touch input are defined in two dimensional space on the touch screen (e.g., an area having width and length). For example, if a user moves his finger in a circular or random movement on the touch screen, the total amount of movement through this 2-D area is used to determine whether the user intends to scroll or select an item.

However, in another embodiment of the present invention, the threshold physical distance and the touch input are defined in one dimensional space on the touch screen (i.e., a straight line). For example, assume that the user's hands are shaky, or the device is being jostled (e.g., on an airplane), etc. The system will ignore any horizontal movement of finger-touches on the touch screen (assuming that the scrollable items are aligned vertically on the touch screen), and interprets only vertical movement of the finger-touches.

In an embodiment of the present invention, the touch distance (i.e., how far the user's finger moves along the touch screen) is set by when the user first puts his/her finger on the touch screen and when the user lifts his/her finger off the touch screen after dragging his/her finger along the touch screen. However, in another embodiment of the present invention, the touch distance is set by some predetermined time, called a temporal threshold. That is, once the user places his/her finger on the touch screen, a timer begins. The distance that the user's finger moves across the touch screen before the timer ends (e.g., 3 seconds) is used as the user's input, from which a determination is made (as described above) as to whether the input should be interpreted as a scrolling input or an item selection input. Thus, the system sets the temporal threshold between the touch start and the touch end.

In one embodiment of the present invention, merely placing his/her finger on the touch screen for a predetermined amount of time defines whether or not this touch input should be interpreted as a scroll or a selection input. For example, meeting the temporal threshold by the touch input (e.g., touching the screen for more than 1 second) causes the selection instruction to be executed for the touch screen, such that selection operations are performed. That is, if the user holds his/her finger on the touch screen, this is interpreted as the user wanting to select the item being touched (e.g., to jump to a related webpage, etc.). If the temporal threshold is not reached (e.g., the use touches the screen for less than 1 second), this is interpreted by the system as a "flicking" touch input, in which the user wants to scroll though items.

In another embodiment of the present invention, the temporal threshold is interpreted in the opposite manner. For example, meeting the temporal threshold by the touch input (e.g., touching the screen for more than 1 second) causes the scrolling instruction to be executed for the touch screen, such that scrolling operations are performed. That is, if the user holds his/her finger on the touch screen, this is interpreted as the user slowly dragging (scrolling) the scrollable items across the touch screen. In this other embodiment, if the temporal threshold is not reached (e.g., the use touches the screen for less than 1 second), this is interpreted by the system as a "tapping" touch input, in which the user wants to select a particular item for execution (e.g., jumping to an application, a webpage, etc.).

As described herein and in one or more embodiments of the present invention, the touch screen is on a mobile device, such as a tablet computer, a smart phone, etc.

In one or more embodiments of the present invention, selection and scrolling behavior is controlled, at high-level, by tracking the position of the pointing device (e.g., the user's finger) by the operating system's command touchStart. If the finger is lifted (touchEnd) without enough movement (touchMove), a selection response is initiated. If the finger is lifted (touchEnd) with enough movement (touchMove), a scrolling response is initiated.

There is a margin of drag that the pointing device (finger) is allowed to move, since most users are unable to exert total motor control and drop and lift their fingers at exactly the same position in the screen (i.e., without moving the finger marginally while is down pointing to the target UI element). Touchdown drag is thus the allowed differential between the position of the finger at touchStart and touchEnd, and can be characterized as the Touchdown Drag Selection Threshold. If that differential is larger than an established threshold, then the behavior is interpreted as drag rather than as a selection, resulting in a scrolling system response. The resulting adjustment reduces the likelihood of accidental selection by dynamically accounting for the pattern/history of gesture behavior exhibited by the user over time.

As described herein and in one or more embodiments of the present invention, the user's actual touchdown drags are captured during scrolling behavior in scroll-ready views. The system adjusts (reduces) the minimum drag (drag threshold) that triggers selection of a UI element in a scroll-ready view.

In one embodiment, the adjustment is determined by a factor determined by user's drag pattern during scroll behavior. A more stringent threshold resulting from this adjustment reduces the likelihood of "false positives", in which the systems interprets a selection gesture when the user intends a scrolling one.

In accordance with one or more embodiments of the present invention, Touchdown Drag equals an area resulting from the differential in XY coordinates at touchStart and touchEnd ([XY coordinate at touchStart]–[XY coordinate at touchEnd]).

Touchdown Drag Selection Threshold is equal to the minimum Touchdown Drag required to initiate a scroll event. A Touchdown Drag smaller than this threshold results in a Selection outcome (the target UI element is selected). For example, consider FIG. 5, which illustrates an exemplary Touchdown Drag Selection Threshold 500. A scrolling event will occur only if the user moves his/her finger 502 in a distance/area that is at least as large as the Touchdown Drag Selection Threshold 500. Any touch input smaller than Touchdown Drag Selection Threshold 500 will result in a selection event occurring.

In one or more embodiments of the present invention, during regular usage of the touch screen during scrolling, the Touchdown Drag is recorded every time the there is a system touchEnd event. The system captures and keeps track of the smallest Scroll Touchdown Margin (min {STM>1, STM>2 . . . STM>N I), in order to adjust the Touchdown Drag Selection Threshold so that it is smaller than or equal to the smallest Scroll Touchdown Margin. This allows the system to customize the touch screen for a particular user. For example, assume in FIG. 6 that a user has dragged his/her finger 602 a distance/area illustrated by Touchdown Drag Selection Threshold 600, which is smaller than the Touchdown Drag Selection Threshold 500 shown in FIG. 5. Thus, any finger movement that is larger than Touchdown Drag Selection Threshold 600 is now deemed to be a scrolling command, even though this finger movement is smaller than that shown for Touchdown Drag Selection Threshold 500 in FIG. 5.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method of avoiding inadvertent touch selection events from a touch screen, the method comprising:
   setting, by one or more processors, a threshold physical distance between a touch start and a touch end for a touch screen;
   receiving, by one or more processors, a touch input from the touch screen;
   determining, by one or more processors, whether the touch input traverses a distance that is less than or greater than the threshold physical distance;
   receiving, by one or more processors, multiple touch inputs from the touch screen, wherein the multiple touch inputs are input by a same user;
   determining, by one or more processors, a smallest distance traversed on the touch screen by the multiple touch inputs;
   setting, by one or more processors, the smallest distance traversed on the touch screen by the multiple touch inputs as the threshold physical distance between the touch start and the touch end;
   in response to determining that the touch input traverses a distance that is less than or equal to the threshold physical distance, activating, by one or more processors, a selection event for an item being displayed at a location currently being touched on the touch screen, wherein the item is from a plurality of scrollable items, and wherein the touch input is determined to be an item selection input for executing an item selection instruction that selects the item being displayed at the location currently being touched on the touch screen; and
   in response to determining that the touch input traverses a distance that is greater than the threshold physical distance, repositioning, by one or more processors, the plurality of scrollable items in accordance with the touch input, wherein the touch input is determined to be a scrolling instruction that scrolls the plurality of scrollable items on the touch screen.

2. The method of claim 1, wherein the item is an icon for a news item, and wherein the selection event expands the news item to provide details of the news item.

3. The method of claim 1, wherein the threshold physical distance and the touch input are defined in one dimensional space on the touch screen.

4. The method of claim 1, wherein the threshold physical distance and the touch input are defined by a circular motion in two dimensional space on the touch screen.

5. The method of claim 1, further comprising:
   setting, by one or more processors, a temporal threshold between the touch start and the touch end, wherein exceeding the temporal threshold by the touch input causes the item selection instruction to be executed for the touch screen, wherein the item is an icon for a news item, and wherein the selection event expands the news item to provide details of the news item in response to the temporal threshold being exceeded by the touch input.

6. The method of claim 1, further comprising:
   setting, by one or more processors, a temporal threshold between the touch start and the touch end, wherein failing to meet the temporal threshold by the touch input causes the scrolling instruction to be executed for the touch screen.

7. The method of claim 1, wherein the touch screen is on a mobile device.

8. A mobile device, wherein the mobile device comprises:
a processor; and
a touch screen, wherein the processor:
sets a threshold physical distance between a touch start and a touch end for a touch screen;
receives a touch input from the touch screen;
determines whether the touch input traverses a distance that is less than or greater than the threshold physical distance;
receives multiple touch inputs from the touch screen, wherein the multiple touch inputs are input by a same user;
determines a smallest distance traversed on the touch screen by the multiple touch inputs;
sets the smallest distance traversed on the touch screen by the multiple touch inputs as the threshold physical distance between the touch start and the touch end;
in response to determining that the touch input traverses a distance that is less than or equal to the threshold physical distance, activates a selection event for an item being displayed at a location currently being touched on the touch screen, wherein the item is from a plurality of scrollable items, wherein the touch input is determined to be an item selection input for executing an item selection instruction that selects the item being displayed at the location currently being touched on the touch screen; and
in response to determining that the touch input traverses a distance that is greater than the threshold physical distance, repositions the plurality of scrollable items in accordance with the touch input, wherein the touch input is determined to be a scrolling instruction that scrolls the plurality of scrollable items on the touch screen.

9. The mobile device of claim 8, wherein the processor further:
receives multiple touch inputs from the touch screen;
determines a smallest distance traversed on the touch screen by the multiple touch inputs;
sets the smallest distance traversed on the touch screen by the multiple touch inputs as the threshold physical distance between the touch start and the touch end.

10. The mobile device of claim 8, wherein the threshold physical distance and the touch input are defined in one dimensional space on the touch screen.

11. The mobile device of claim 8, wherein the threshold physical distance and the touch input are defined in two dimensional space on the touch screen.

12. The mobile device of claim 8, wherein the processor further:
sets a temporal threshold between the touch start and the touch end, wherein exceeding the temporal threshold by the touch input causes the scrolling instruction to be executed for the touch screen.

13. The mobile device of claim 8, wherein the processor further:
sets a temporal threshold between the touch start and the touch end, wherein failing to meet the temporal threshold by the touch input causes the item selection instruction to be executed for the touch screen.

14. A computer program product for avoiding inadvertent touch selection events from a touch screen, the computer program product comprising a computer readable storage medium having program code embodied therewith, wherein the computer readable storage medium is not a transitory signal per se, and wherein the program code is readable and executable by a processor to perform a method comprising:
setting a threshold physical distance between a touch start and a touch end for a touch screen;
receiving a touch input from the touch screen;
determining whether the touch input traverses a distance that is less than or greater than the threshold physical distance;
receiving multiple touch inputs from the touch screen, wherein the multiple touch inputs are input by a same user;
determining a smallest distance traversed on the touch screen by the multiple touch inputs;
setting the smallest distance traversed on the touch screen by the multiple touch inputs as the threshold physical distance between the touch start and the touch end;
in response to determining that the touch input traverses a distance that is less than or equal to the threshold physical distance, activating a selection event for an item being displayed at a location currently being touched on the touch screen, wherein the item is from a plurality of scrollable items, and wherein the touch input is determined to be an item selection input for executing an item selection instruction that selects the item being displayed at the location currently being touched on the touch screen; and
in response to determining that the touch input traverses a distance that is greater than the threshold physical distance, repositioning the plurality of scrollable items in accordance with the touch input, wherein the touch input is determined to be a scrolling instruction that scrolls the plurality of scrollable items on the touch screen.

15. The computer program product of claim 14, wherein the method further comprises:
receiving multiple touch inputs from the touch screen;
determining a smallest distance traversed on the touch screen by the multiple touch inputs;
setting the smallest distance traversed on the touch screen by the multiple touch inputs as the threshold physical distance between the touch start and the touch end.

16. The computer program product of claim 14, wherein the threshold physical distance and the touch input are defined in one dimensional space on the touch screen.

17. The computer program product of claim 14, wherein the threshold physical distance and the touch input are defined in two dimensional space on the touch screen.

18. The computer program product of claim 14, wherein the method further comprises:
setting a temporal threshold between the touch start and the touch end, wherein exceeding the temporal threshold by the touch input causes the scrolling instruction to be executed for the touch screen.

19. The computer program product of claim 14, wherein the method further comprises:
setting a temporal threshold between the touch start and the touch end, wherein failing to meet the temporal threshold by the touch input causes the item selection instruction to be executed for the touch screen.

20. The computer program product of claim 14, wherein the touch screen is on a mobile device.

* * * * *